Figure 1:
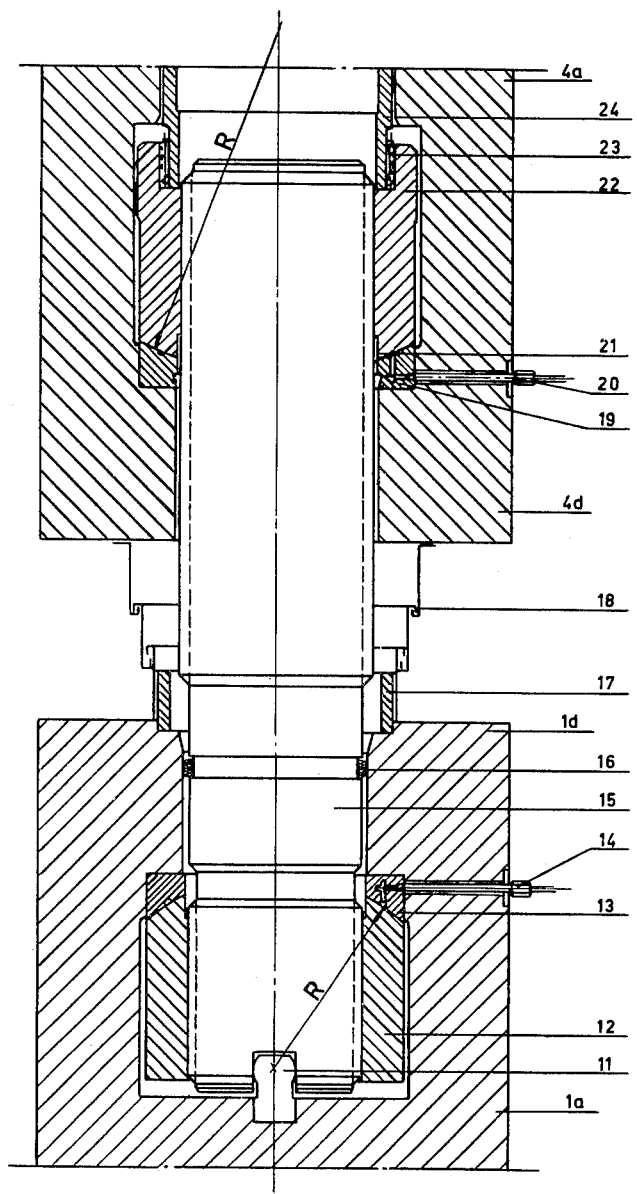

May 31, 1966  S. E. M. NORLINDH  3,253,447
FREELY ADJUSTABLE ROLL MOUNTING
Filed March 4, 1963  4 Sheets-Sheet 1

INVENTOR.
Sven Erik Malte Norlindh
BY
Pierce, Scheffler & Parker
his attys

May 31, 1966   S. E. M. NORLINDH   3,253,447
FREELY ADJUSTABLE ROLL MOUNTING
Filed March 4, 1963   4 Sheets-Sheet 3
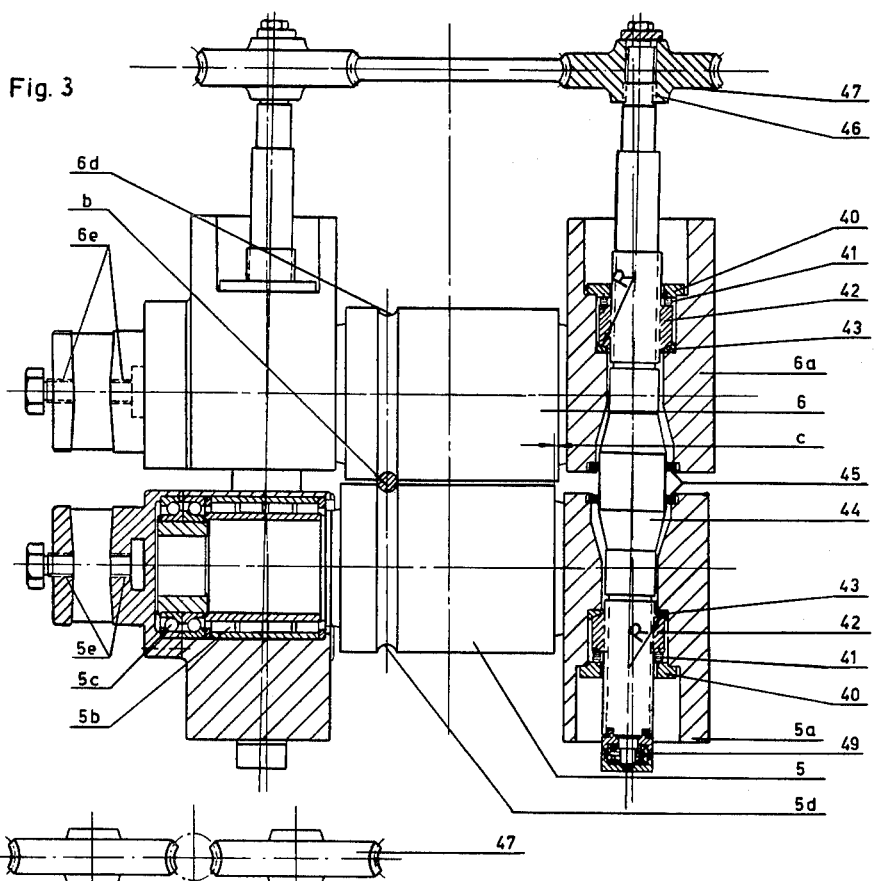
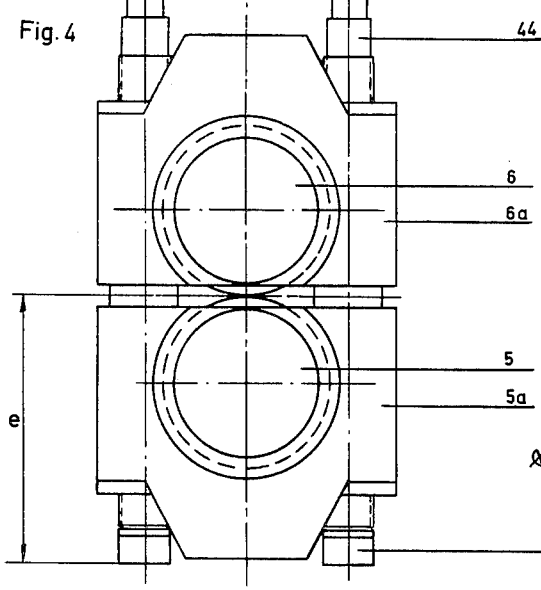
INVENTOR.
Sven Erik Malte Norlindh
BY
attys May 31, 1966  S. E. M. NORLINDH  3,253,447
FREELY ADJUSTABLE ROLL MOUNTING
Filed March 4, 1963  4 Sheets-Sheet 4

INVENTOR.
Sven Erik
BY Malte Norlindh

3,253,447
FREELY ADJUSTABLE ROLL MOUNTING
Sven Erik Malte Norlindh, Morgardshammar, Sweden, assignor to Morgardshammars Mek. Verkstads Aktiebolag, Morgardshammar, Sweden, a joint-stock company of Sweden
Filed Mar. 4, 1963, Ser. No. 262,682
Claims priority, application Sweden, Mar. 8, 1962, 2,577/62
7 Claims. (Cl. 72—240)

In roll mountings transferring the rolling pressure directly from one bearing casing to the other, it was heretofore usual practice to use a spherical roller bearing per roll neck.

When employing this constructional principle in rolling mills operating with high rolling pressures in relation to the roll diameter, it is necessary, in order to obtain a satisfactorily long service life of the bearings, to use rigid bearings, for example high pressure lubricated slide bearings, four-row conical roller bearings, double spherical roller bearings or cylindrical roller bearings. The aforesaid types of bearings are sensitive to edge loads. For this reason, the construction must be designed such that the bearing casings can adjust to the inclination of the roll neck due to varying loads. This requirement is substantially met if the head of the adjusting screw is laterally movable through an oval aperture in a bush. At varying rolling pressures, there occurs, however, a certain bending of the adjusting screws which gives rise to resistance against the self-adjustment of the bearing casings which, in turn, shortens the service life of the roller bearings, because the different rows of rollers are subjected to different loads, while in the case of slide bearings there is the risk of cuts and scratches in the end surfaces. In cylindrical roller bearings the rollers have a tendency to skew when subjected to edge loads. For this reason, it is here of special importance that the bearing casings can adjust unimpeded to the direction of the roll neck.

It was first by this invention that perfect self-adjustment of the bearing casings with simultaneous transfer of the rolling pressure by surface abutment was obtained.

In rolling mills, it is in all normal cases of essential importance that the entire roll mounting be as precisely formed as possible, so that satisfactory tolerances of the rolled product are achieved. Due to the fact that the transfer of the rolling pressure by point and line surface contact causes considerable springing, it is of importance to exchange the said surfaces with spherical surfaces adapted to adjust themselves by assuming the angles required while maintaining perfect surface abutment of such a magnitude that the surface pressure will be moderate and the surfaces will not be damaged during operation.

The roll mounting according to the invention is characterized in that the nuts (end portions) or heads of the adjusting screws have such rounded, preferably spherical surface abutment against correspondingly shaped contact surfaces provided in the roll bearing casings, for example washers shrunk in or screwed in, for transferring the rolling pressure from one roll bearing casing receiving the rolling pressure directly to the other roll bearing casing receiving the rolling pressure via adjusting screws, that the angular positions between the roll bearing casings in relation to adjusting screws, adjusting nuts and setting gear can freely adjust within necessary limits during operation according to varying load.

The invention is illustrated in FIG. 1 showing rotary nuts and axially fixed adjusting screws, while in FIGS. 2, 3, 4 and 5 the adjusting screws are shown rotary and the nuts fixed.

FIG. 1 is an enlarged sectional view through a portion of a roll mill assembly, including a section through a single adjusting screw of the assembly, illustrating the embodiment wherein the adjusting screw is axially fixed whilst the associated adjusting nut is rotary.

In FIG. 1, part 4a is a portion of an upper bearing casing, whilst part 1a is a corresponding portion of a lower bearing casing. Rolling pressure is transferred from lower backing roll bearing casing 1a to an adjusting screw 15 on each side of the bearings of rolls (not shown in FIG. 1) to the upper backing roll bearing casing 4a. The two adjusting screws 15 have synchronized setting and are driven by an adjusting screw gear. Adjusting screw 15 is coupled to nut 12 and to nut 22 by mating threads which threads are indicated in FIG. 1 by dashed lines parallel to the inner faces of said nuts. Similarly, in FIG. 2 dashed lines parallel to the inner face of nut 65 indicate that said nut 65 and screw 68 are coupled together by mating threads.

In FIG. 1, 11 designates a key preventing rotary movement of the adjusting screw 15 and the lower nut 12. Key 11, seen in endwise position in FIG. 1, extends across the end face of screw 15, which latter has a transverse keyway cut across its end face. Likewise, a keyway is cut in the bottom of roll bearings casing 1a, this latter keyway accommodating the lower portion of key 11. The major dimension of key 11 and of said keyways extends perpendicularly to the plane of FIG. 1. Nut 12 rests with its spherical surface with the radius R upon a washer 13 shrunk into the bearing casing 1a, thereby transferring the rolling pressure of the material undergoing rolling by perfect surface abutment from the bearing casing 1a to the nut 12. Thanks to the spherical transferring surfaces the surface contact can be maintained even when the rolling pressure varies without subjecting the bearings 1b to edge loads, and the springing against the rolling pressure can be held at a minimum, due to the absence of the considerable springing caused by point and line contact.

When desired, the friction on the spherical surfaces can be reduced by supplying high pressure oil through the tube 14.

The details 16, 17 and 18 are packings preventing water and impurities from entering into the adjusting screw equipment.

The sperical surface R on the adjusting nut 22 and the washer 19 with associated high pressure oil supply tube 20 shrunk into the bearing casing 4a transfer the rolling pressure from the adjusting screw 15 to the upper backing roll bearing casing 4a. Due to its shrinking into the bearing casing, the washer 19 is as precisely complementary as if the spherical surface were shaped directly in the bearing casing.

For effecting the roll setting, the adjusting nut 22 is rotated by spline 23 in the sleeve 24, FIG. 1, said spline transfer 23 being so designed that adjusting nut 22 can freely adjust and assume the angular positions required with respect to the bending of the rolls at varying rolling pressures.

FIG. 1 shows an oil seal 21 between the threads of the adjusting nut 22 and the adjusting screw 15, rendering it possible to maintain perfect lubrication of the threads by circulating oil. An opening for the mounting of the adjusting nut 22 and washer 19 is closed by the cap 4d.

The fastening of the roll mounting is not shown and is neither subject of this patent application.

Figure 2:
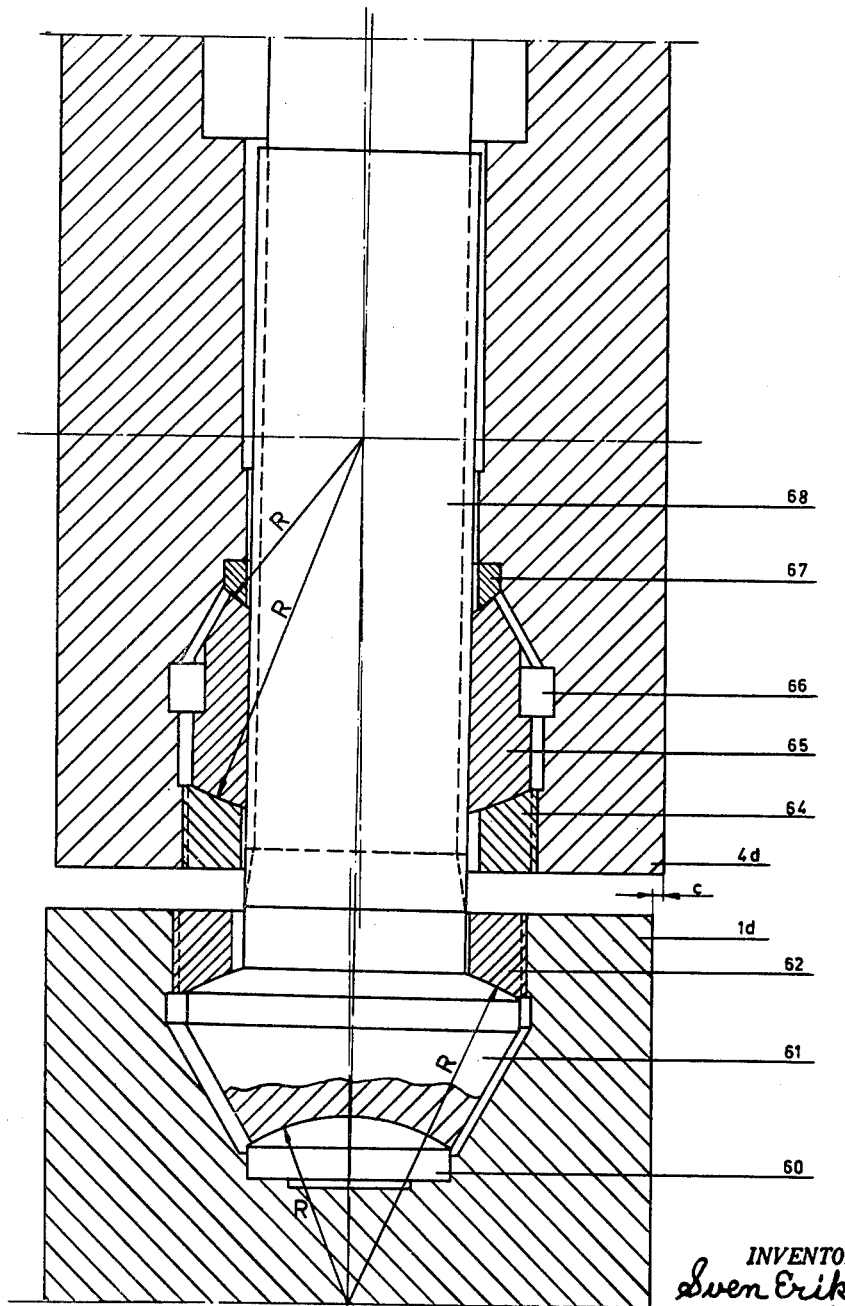

The spherical washers 13, 19 in FIG. 1 may also be secured by screwing them into the extended portion 1d, 4d, as shown in FIG. 2, where the adjusting screws are rotary for setting the roll setting. In this embodiment, the adjusting screw 68 has a head 61 anchored in the extended portion 1d of the backing roll bearing casing by a washer 62 threaded in into spherical abutment against the head 61 of the adjusting screw. When desired, the head 61 may be supported at its lower end on a spherical washer 60 in the backing roll bearing casing, so that the upper backing roll 4 is maintained lifted.

The nut 65 is anchored by similar washers 63 and 67 respectively in the extended portion 4d of the upper backing roll bearing casing and prevented from rotation by keys 66.

Theoretically, there is nothing to prevent designing the contact surfaces between the nut 65 and the washers 64 and 67 with cylindrical shape, the axis of the cylinder extending in parallel with the direction of the material to be rolled.

FIG. 3 shows a side view of the roll mounting in a two-high mill, the bearing casings partially sectioned through the roll bearings and the adjusting screws. FIG. 4 shows an end view of the same mounting.

FIG. 3 shows in an exaggerated manner the angular positions of the adjusting equipment, the rolls 5 and 6 adjusted axially to the displacement measure C so that the roll grooves 5d and 6d produce a circular rolled material b. The axial adjustment is carried out by the screws 5e and 6e against fixed guide surfaces (not shown). The adjusting screws 44 adjust themselves by the spherical surfaces R into inclined position, and a suitably shaped spline connection 46 effects strainless transfer of the positions of the adjusting screws 44 to the adjusting screw gear 47.

In this case, the nuts 42 are secured against rotation by keys against the caps 40 fastened in the bearing casings 5a and 6a. Cup springs 41 retain the nuts 42 pressed against the spherical surfaces, thereby keeping the upper roll 6 in lifted state. The thread play for the upper roll is, however, not eliminated. Packings 45 of piston ring type prevent water and impurities from entering.

By means of the bearings 49 in the lower end of the right-hand and left-hand threaded adjusting screws 44, the roll mounting can rest upon a support, so that the height e, FIG. 4, of the rolling line is maintained unchanged irrespective of the spacing set between the rolls. This is of importance in continuous rolling mills for steel bars and bands where the material to be rolled is required to run in an exact straight path between the roll pairs irrespective of edging or flat passes.

Figure 5:
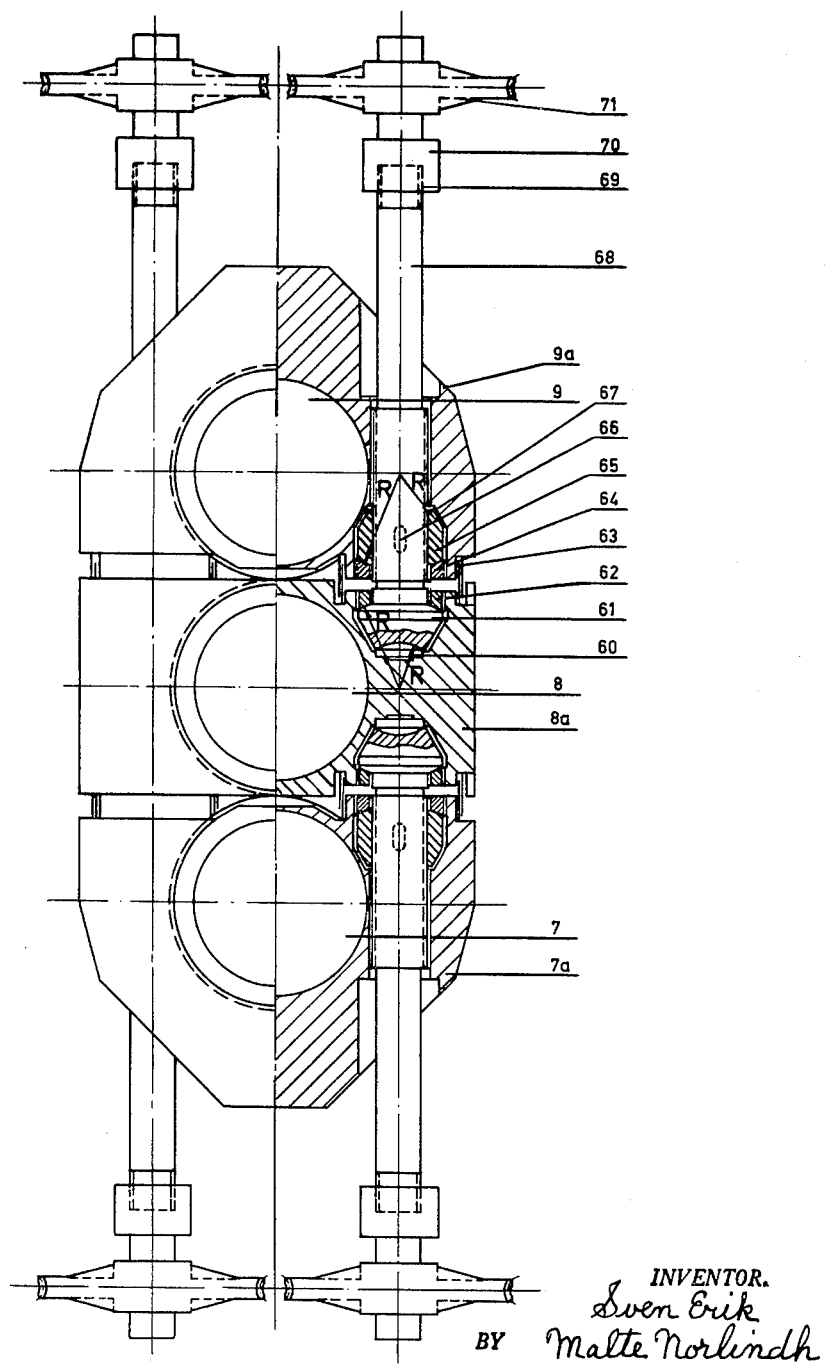

FIG. 5 shows a roll mounting in a three-high rolling mill with rotary adjusting screw 68 provided with a head 61 which has spherical contact surfaces adapted both for transferring the rolling pressure and for lifting the upper roll via the spherical washer 60 and 67.

The adjusting screw 68 is held anchored in the intermediate bearing casing 8a by a ring 62 threaded in, said ring having a spherical contact surface against the head 61 of the adjusting screw. The nut 65 is prevented from rotation by keys 66 and is anchored in the bearing casing 9a by a ring 64 threaded in, the said ring having a spherical contact surface against the nut 65. The upper bearing casing is lifted by abutment against the spherical washer 67. Packings 63 prevent water and impurities from entering into the abutment surfaces.

A suitably shaped angularly movable coupling 69 against the adjusting screw gear 70, 71 allows the adjusting screws to incline in the angular positions required with respect to the bending and axial position of the rolls.

It is noted that my co-pending patent application Serial No. 262,622, filed March 4, 1963, discloses subject matter similar to that above set forth.

What I claim is:

1. A roll mounting for rigid roll bearings, including cylindrical slide bearings and multi-row roller bearings, housed in roll bearing casings and having adjusting screws the ends of which cooperate with parts of some of said casings wherein the transfer of rolling pressure is effected directly from one roll bearing casing to the other roll bearing casing via said adjusting screws having pressure transferring surfaces with rounded, end portions and complementary rounded abutting surfaces formed in said roll bearing casings whereby the relative angular positions between said adjusting screws and their respective casings are adjustable during rolling at varying loads.

2. A roll mounting according to claim 1, including means at the rounded pressure transferring surfaces for the supply of high-pressure lubricant to said surfaces in order to reduce the friction so as to expedite self-adjustment of the bearing casings and adjustment of the roll pass during a rolling operation.

3. A roll mounting according to claim 2, characterized in that the rounded end surfaces are provided on nuts in threaded engagement with said adjusting screws.

4. A roll mounting according to claim 2, characterized in that the rounded end surfaces are provided on heads of said adjusting screws.

5. A roll mounting according to claim 2, characterized in that the rounded end surfaces have spherical shape.

6. A roll mounting according to claim 2, characterized in that the rounded end surfaces are provided on washers secured with a shrink fit in said casings.

7. A roll mounting according to claim 2, characterized in that the rounded end surfaces are provided on washers fastened by means of threads in said casings.

References Cited by the Examiner

UNITED STATES PATENTS

| | | | |
|---|---|---|---|
| 1,796,447 | 3/1931 | Foren | 80—55 XR |
| 2,042,872 | 6/1936 | Talbot | 80—55.1 |
| 2,155,747 | 4/1939 | Wood | 80—56.9 |
| 2,294,970 | 9/1942 | Fagerstrom et al. | 80—55 |
| 2,506,681 | 5/1950 | Norlindh | 80—55.1 XR |

CHARLES W. LANHAM, *Primary Examiner.*

WILLIAM J. STEPHENSON, *Examiner.*

C. H. HITTSON, *Assistant Examiner.*